US010717120B2

(12) United States Patent
Liu et al.

(10) Patent No.: US 10,717,120 B2
(45) Date of Patent: Jul. 21, 2020

(54) SAND/WATER REMEDIATION METHOD WITH A PHOTOCATALYTIC FUEL CELL

(71) Applicant: Dalian University of Technology, Dalian, Liaoning Province (CN)

(72) Inventors: Lifen Liu, Dalian (CN); Rui He, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/314,639

(22) PCT Filed: Oct. 1, 2017

(86) PCT No.: PCT/CN2017/105207
§ 371 (c)(1),
(2) Date: Dec. 31, 2018

(87) PCT Pub. No.: WO2018/209883
PCT Pub. Date: Nov. 22, 2018

(65) Prior Publication Data
US 2019/0308231 A1 Oct. 10, 2019

(30) Foreign Application Priority Data

May 18, 2017 (CN) .......................... 2017 1 0351786

(51) Int. Cl.
*B09C 1/00* (2006.01)
*B09C 1/08* (2006.01)
(Continued)

(52) U.S. Cl.
CPC ............... *B09C 1/085* (2013.01); *B09C 1/00* (2013.01); *B09C 1/02* (2013.01); *C02F 1/30* (2013.01); *C02F 1/725* (2013.01); *C02F 2305/10* (2013.01)

(58) Field of Classification Search
CPC .............. B09C 1/02; B09C 1/08; B09C 1/085
See application file for complete search history.

(56) References Cited

U.S. PATENT DOCUMENTS

| 2004/0013470 A1 | 1/2004 | Stengel | |
|---|---|---|---|
| 2014/0083933 A1* | 3/2014 | Choi | ....................... C02F 1/469 |
| | | | 210/603 |
| 2016/0064758 A1* | 3/2016 | Lalman | ................... H01M 8/06 |
| | | | 429/2 |

FOREIGN PATENT DOCUMENTS

| CA | 2763235 C | 2/2014 |
|---|---|---|
| CN | 104617323 A | 5/2015 |

(Continued)

*Primary Examiner* — Janine M Kreck
(74) *Attorney, Agent, or Firm* — Muncy, Geissler, Olds & Lowe, PC

(57) ABSTRACT

A method in sand/water remediation by using photocatalytic fuel cell is related to the sewage treatment and sand/soil remediation field. The characteristic photocatalytic fuel cell uses photons or solar energy to produce highly active electron/holes is introduced to degrade pollutants. In the constructed visible light photocatalytic fuel cell, there is overlying water above polluted sands in a tubular reactor. Allowing static adsorption equilibrium to buildup, in the built photocatalytic fuel cell, the photocatalytic anode and photoelectric catalytic cathode are connected by wires with an external resistance. Using 50 W halogen lamp as the light source, it maintains photocatalysis and electro-catalytic reactions to degrade pollutants in the method. By degrading the pollutants in the overlying water, the pollutants in the sand are also desorbed and degraded, and rapidly decreased to a very low level. Thus in this method water purification treatment and sand remediation take place simultaneously.

7 Claims, 2 Drawing Sheets

(Fig.1 as an illustration in Abstract)

(51) Int. Cl.
*B09C 1/02* (2006.01)
*C02F 1/30* (2006.01)
*C02F 1/72* (2006.01)

(56) References Cited

FOREIGN PATENT DOCUMENTS

| | | |
|---|---|---|
| CN | 105140551 A | 12/2015 |
| CN | 106391680 A | 2/2017 |
| CN | 107081333 A | 8/2017 |

\* cited by examiner

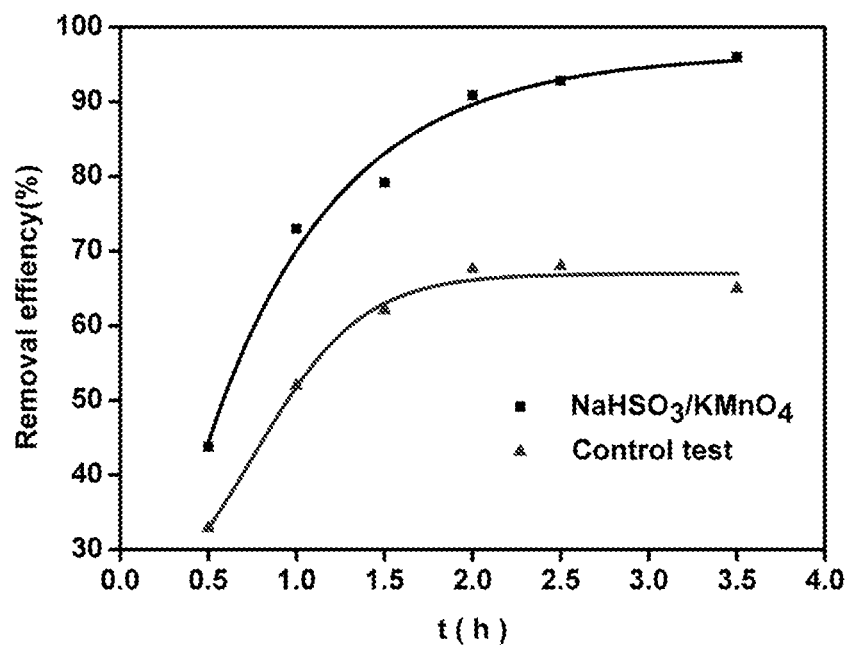
Fig. 1 (Fig.1 as an illustration in Abstract)
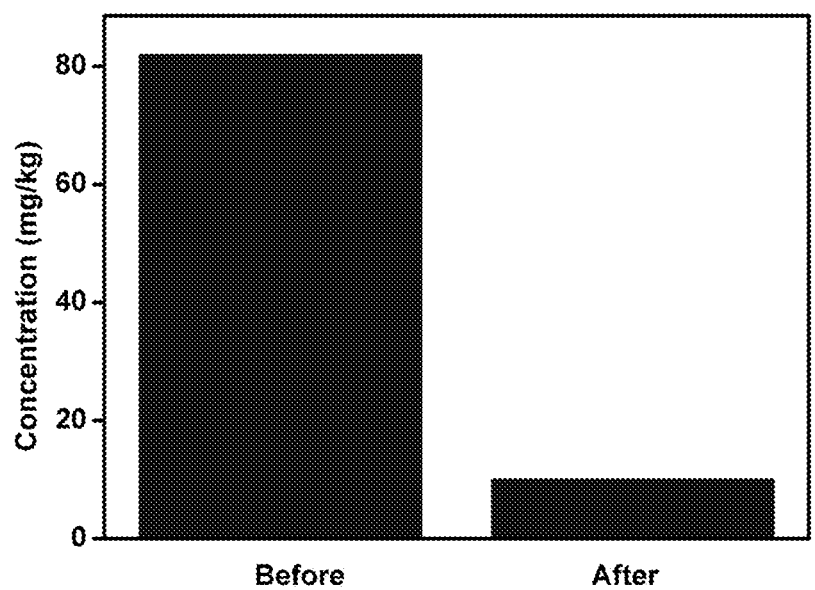
Fig. 2

SAND/WATER REMEDIATION METHOD WITH A PHOTOCATALYTIC FUEL CELL

FIELD OF THE INVENTION

The method is related to the sewage treatment and soil/sand remediation technology, involving the preparation of catalytic electrode, building integrated synergetic photocatalysis and electro-catalysis in photocatalytic fuel cell sand/water restoration system. The system could introduce and generate active species that degrade pollutants and generate electricity simultaneously, decontaminate sand/water and recover energy.

BACKGROUND OF THE INVENTION

Photocatalytic fuel cell (PFC) is a new kind of fuel cell, in which photocatalytic cathode and photocatalytic anode electrode are connected by wire with external resistance. When photocatalytic electrodes are illuminated by photons that have higher energy than the band gap, they produce abundant active electron/holes, which then form active oxidizing species degrade pollutants efficiently. The electrons transfer from the anode to the catalytic cathode through the external circuit timely, promote separation of electronic/holes on the electrodes. They can achieve electricity recovery and pollutants removal at the same time. PFCs with catalytic electrodes overcome the shortcoming of powder catalysts and greatly improve the Photocatalytic degradation efficiency of pollutants, in the meantime generate electricity.

Environmental pollution and energy consumption are two major challenges to the whole world, soil/sands are important parts in ecological environment, may have been polluted in varied degrees, soil pollution could directly lead to changes in the composition and physical/chemical properties of the soil, damage the normal function, decrease agricultural production and cause serious economic loss. Soil remediation technologies mainly are physical, chemical or biological methods, that transform, being adsorbed/absorbed and/or degraded, that reduce the concentration of the pollutants in soil, and convert to harmless components to environment or human. New Soil remediation techniques are still being developed, many are in early stage, followed developments in equipments for engineering application are started at a relatively even late stage. Facing increasingly serious soil pollution, it is of great significance to develop sustainable technologies to restore/remediate contaminated sites.

Photocatalytic fuel cell, can use clean solar energy, produce electricity at the same time, promote the degradation of pollutants, it has great value as a novelty fuel cell system. The existing soil remediation methods have their own specific application scope and limitation. No reports were found about introducing photocatalytic fuel cells to soil remediation. This application introduces photocatalytic fuel cell into soil remediation, with polluted sand as pollution medium, the constructed Special photocatalytic fuel cells for sand/water remediation are demonstrated and proved. By increasing the degradation rate of pollutants and producing electricity, the application is expected providing an efficient, low-cost, eco-environmental-friendly method of soil/sand remediation.

BRIEF SUMMARY OF THE INVENTION

The purpose of the invention is to provide a new kind of sand/water remediation method, thus visible light photocatalytic fuel cell was constructed with Ag/Ag/GO as anode catalyst and $ZnIn_2S_4$ as cathode photocatalyst, plus that the introduction of reactive species such as manganese (III) from KMnO4/bisulfite promoted photo-electro-catalytic degradation of pollutants, achieved remediation of water/sand sites finally using visible lights illumination.

A new type photocatalytic fuel cell was used to decontaminate polluted sites with sand/water, Steps are as follows:

Based on the features of photocatalytic fuel cell, which can produce highly active electronic/holes to degrade pollutants under solar illumination, PFC was introduced into soil remediation/decontamination, by constructing visible light/solar light photocatalytic fuel cell.

The method is consisted of using a tubular reactor with overlying water and sand, where static adsorption equilibrium might establish. The photocatalytic fuel cell was built containing photocatalytic anode and photoelectric catalytic cathode, connected by wires, with 50 W halogen lamp as the light source, that photocatalysis and electro-catalytic reaction were carried out to degrade pollutants. By degrading the pollutants in the overlying water, the pollutants in sand was decreased, the content of pollutants in the sand was reduced to a very low level, achieving the remediation function.

Active species were produced by dropping in $KMnO_4$/bisulfate, $MnO_4^-$ reacted with $HSO_3^-$ formed Mn(III), thus improved photocatalytic degradation of pollutants.

Cyclodextrin was added to the method reactor, it promotes the mass transfer between sand and water, that more pollutants migrated from the sand to the overlying water, and then degraded by photo-electro-catalysis, achieved water purification and sand remediation.

The photocatalytic anode is Ag/Ag/GO and the photocatalytic cathode is $ZnIn_2S_4$.

Ag/Ag/GO nano-photocatalyst was prepared by precipitation-photo reduction method, using silver ammonia solution as the silver source, and it was used as anode catalyst.

$ZnIn_2S_4$ was synthesized by hydrothermal method and $ZnIn_2S_4$ was used as cathode photocatalyst.

Silica sol was prepared by stirring the mixture, which made by ethyl ortho-silicate, anhydrous ethanol, deionized water and Concentrated hydrochloric acid at a volume ratio of 4.5:10:9:2.45. Adding catalysts into silica sol, stirred thoroughly to a gain a homogeneous paste. Catalytic electrodes were prepared by evenly coated the paste into stainless steel mesh with the size 5 cm*3 cm, then dried at room temperature. The amount of nano-photocatalyst per square centimeter is 5 mg.

The benefits of the invention are as follows: The present invention provides a new method for the decontamination and degradation of pollutants in polluted sites with sand/water. Using photocatalytic fuel cells produce highly active electron/holes under solar illumination, so pollutants were degraded by photocatalysis and electro-catalysis. Photocatalytic fuel cell in sand remediation method, with active Mn(III) introduced, simultaneously accelerate the degradation of pollutants and produced electricity; In addition, through promoting the mass transfer of pollutants between sand and water interface from the sand to the overlying water using CD, the pollutants in the sand decreased more quickly with the degradation of overlying water. The method achieved purification of sand/water, which provided an efficient and low-cost, ecological and environmental soil restoration method.

BRIEF DESCRIPTION OF THE DRAWINGS

FIG. 1 is a comparison diagram of the degradation effect of the pollutants in the overlying water before and after the addition of sodium bisulfite/potassium permanganate in the process of sand/water remediation in photocatalytic fuel cells.

FIG. 2 shows the decontamination of sand pollution in the remediation method of sodium bisulfite/potassium permanganate. The concentration of pollutants in the sand was obviously reduced.

DETAILED DESCRIPTION OF THE INVENTION

Figure 3:
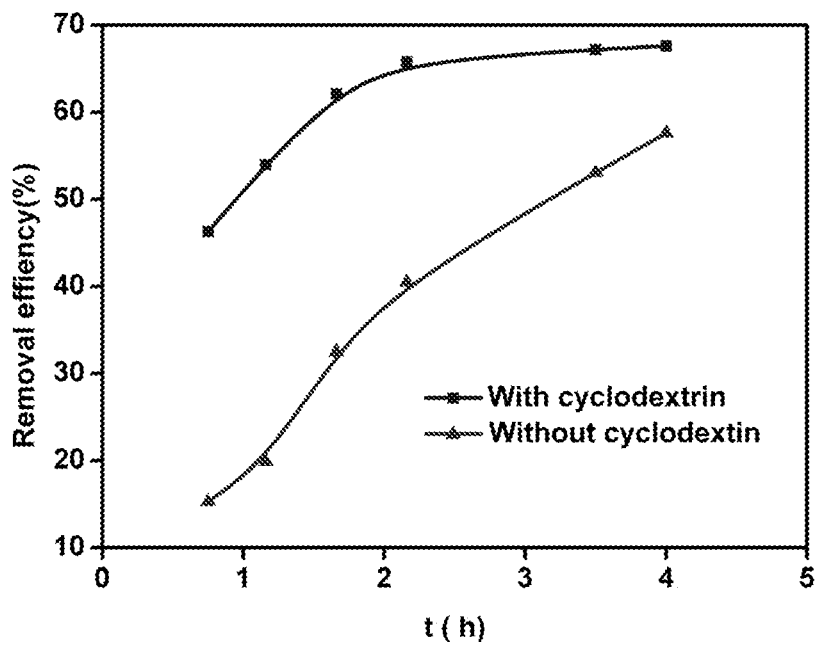
FIG. 3 is a comparison diagram of the degradation effect of the pollutants in the overlying water after cyclodextrin addition.

The following are detailed descriptions of the implementation example of the technical scheme and the attached figures.

Example 1: The Degradation of Tetracycline in the Sand/Water Remediation Method of Photocatalytic Fuel Cell At the bottom of the tubular reactor, 25 g of sand was added, and 150 mL of 20 mg/L tetracycline solution was put into the reactor, settled 1d for adsorption equilibrium. Catalyst Ag/AgCl/GO loaded stainless steel was used as Photocatalytic anode, ZnIn2S4 loaded on stainless steel as photocatalytic cathode, an external 51Ω resistance was connected, with 50 w halogen lamp placed on the top, the light source was 5 cm from the solution surface. Take samples at intervals for analysis. If Add $KMnO_4$ and $NaHSO_3$ at the same time (The concentration of KMnO4 in the solution was 7 mg/L, and $NaHSO_3$ was 23 mg/L), then water samples and soil samples were taken simultaneously for analysis measurement. The water samples were measured by uv—visible spectrophotometer at 358 nm after filtration of 0.45 um. The soil samples were dried in 50° C. in oven. 3 mL extract was added with the mixture of 0.1 mol/L NaCl, 0.5 mol/L oxalate and ethanol (25/25/50 volume ratio). After fully shaking, followed ultrasound treatment for 15 min, 8000 r/min centrifugation for 10 min. Repeat the above extraction for three times, the extract was determined after filtration.

FIG. 1 shows that as time goes on, the degradation rate of tetracycline in the solution was increasing, more significantly after the addition of $KMnO_4$ and $NaHSO_3$. FIG. 2 shows that the content change of tetracycline in sand before and after the addition of $KMnO_4$ and $NaHSO_3$. The results showed that the content of tetracycline in the sand was significantly decreased after the addition.

Example 2: The Effect of Cyclodextrin on the Degradation of Tetracycline in the Remediation Method 25 g of sand was added to the bottom of the tubular reactor. 150 ml 20 mg/L tetracycline solution was put in, also 5 mg cyclodextrins. The tetracycline solution without cyclodextrin was used as the control group, set aside for one day stay for adsorption equilibrium; With 50 w halogen lamp placed above the reactor, catalyst Ag/AgCl/GO was loaded stainless steel for Photocatalytic anode, stainless steel as cathode, 51Ω external resistance was connected in the circuit, water samples were took at intervals, measured by uv-visible spectrophotometer after filtration of 0.45 um.

FIG. 3 shows that the content of tetracycline in solution decreases gradually, the degradation rate increases with time. After adding cyclodextrin, the degradation rate of tetracycline is increased.

Example 3: The Degradation of RhB in the Sand/Water Remediation Method by Photocatalytic Fuel Cell 25 g of sand was added to the tubular reactor, 150 mL 20 mg/L RhB solution with 0.1 mol/L $Na_2SO_4$ was put in. It was set aside for one day, after reaching adsorption equilibrium. Photocatalytic fuel cells was constructed using electrodes inserted in overlying water (using Ag/AgCl/GO loaded photocatalytic anode and $ZnIn_2S_4$ loaded cathode), 100Ω external resistance was connected. 50 w halogen lamps were installed on both sides of the catalytic electrodes for vertical illumination, 5 cm away from photocatalytic electrodes. Water samples and soil samples were took at intervals, The water samples were filtered by 0.45 um filter and measured at 553 nm with spectrophotometer. The sand was extracted using ultra pure water. 3 mL water extract was added for extraction each time, then vortex, ultrasonic treatment 15 min, then 8000 r/min centrifugation for 10 min, repeated extraction three times. All extracts were combined after three extractions, then the extract was measured.

Figure 4:
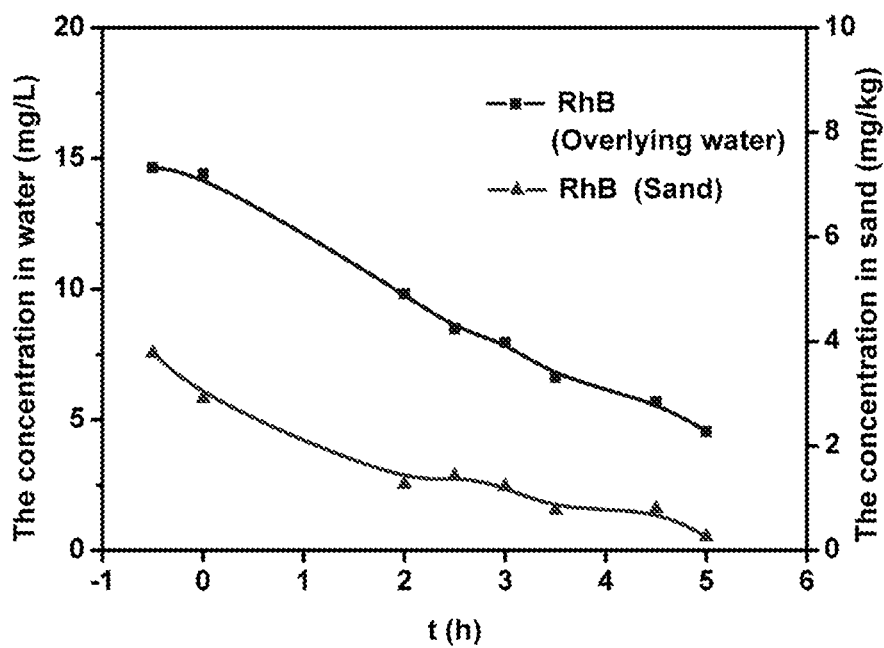
FIG. 4 shows the distribution of pollutants in water and sand over time in the remediation method.

FIG. 4 shows the concentration of RhB in overlying water and sand. The concentration of RhB in sand/water gradually decreased over time. It shows that the concentration of RhB in overlying water can influence the distribution of RhB in sand. By degrading and decreasing the content of RhB in the overlying water, the content in sand was also reduced and the remediation was achieved.

We claim:

1. A method for sand/water remediation by using a photocatalytic fuel cell, wherein the photocatalytic fuel cells apply photons and/or solar energy to excite highly active electron/holes to degrade pollutants; and the photocatalytic fuel cells are visible light responsive; the method comprising the steps of:
    overlying water over sand in a tubular reactor;
    treating pollutant solution with the pollutants that may reach static adsorption equilibrium;
    establishing the photocatalytic fuel cells with immersed photocatalytic anode and photoelectric catalytic cathode that are connected by wires; and
    providing 50 W halogen lamp for photocatalysis and electro-catalytic reactions to degrade the pollutants in the tubular reactor; wherein by degrading the pollutants in the overlying water, the pollutants in sand is desorbed and degraded, to decrease the pollutants in sand and achieve the remediation.

2. The method according to claim 1, wherein Mn(III) is produced by dropping-in solution containing $KMnO_4$/bisulfate, $MnO_4^-$ reacted with $HSO_3^-$ to improve photocatalytic degradation of the pollutants.

3. The method according to claim 1, further comprising adding cyclodextrin to the sand to promote the pollutant migrating from the sand to the overlying water, and degrading the pollutants by the photocatalysis and electro-catalytic reactions to achieve the water decontamination and sand remediation.

4. The method according to claim 1, wherein the photocatalytic anode is Ag/Ag/GO and the photocatalytic cathode is $ZnIn_2S_4$.

5. The method according to claim 3, wherein the photocatalytic anode is Ag/Ag/GO and the photocatalytic cathode is $ZnIn_2S_4$.

6. The method according to claim 4, wherein the photocatalytic anode is Ag/Ag/GO and prepared by precipitation-light reduction method, in which silver-ammonia solution is used as a silver source;

the photocatalytic cathode is $ZnIn_2S_4$ and synthesized by a hydrothermal method;

silica sol is prepared by stirring the mixture of ethyl ortho-silicate, anhydrous ethanol, deionized water and concentrated hydrochloric acid, at a volume ratio of 4.5:10:9:2.45; after adding photo-catalysts into the silica sol, the sol is stirred thoroughly to a gain a uniform sol-paste; catalytic electrodes are prepared by evenly coating the sol-paste onto a stainless steel mesh sized at 5 cm*3 cm, then dried at room temperature; the amount of nano-photocatalyst per square centimeter is 5 mg.

7. The method according to claim 5, wherein the photocatalytic anode is Ag/Ag/GO and obtained by precipitation-light reduction method, in which silver-ammonia solution is used as a silver source;

the photocatalytic cathode is $ZnIn_2S_4$ and synthesized by hydrothermal method;

silica sol is prepared by stirring a mixture with ethyl orthosilicate, anhydrous ethanol, deionized water and concentrated hydrochloric acid at a volume ratio of 4.5:10:9:2.45; after adding catalysts into silica sol, the sol is stirred thoroughly to a gain a homogeneous sol paste; catalytic electrodes are prepared by evenly coating the paste into stainless steel mesh with the size of 5 cm*3 cm, then air dried at room temperature; the amount of nano-photocatalyst per square centimeter is 5 mg.

\* \* \* \* \*